March 18, 1930. G. W. KELLER 1,751,160
DRIVING AND ENGINE TRUCK BOX LUBRICATOR
Filed July 6, 1928 2 Sheets-Sheet 1
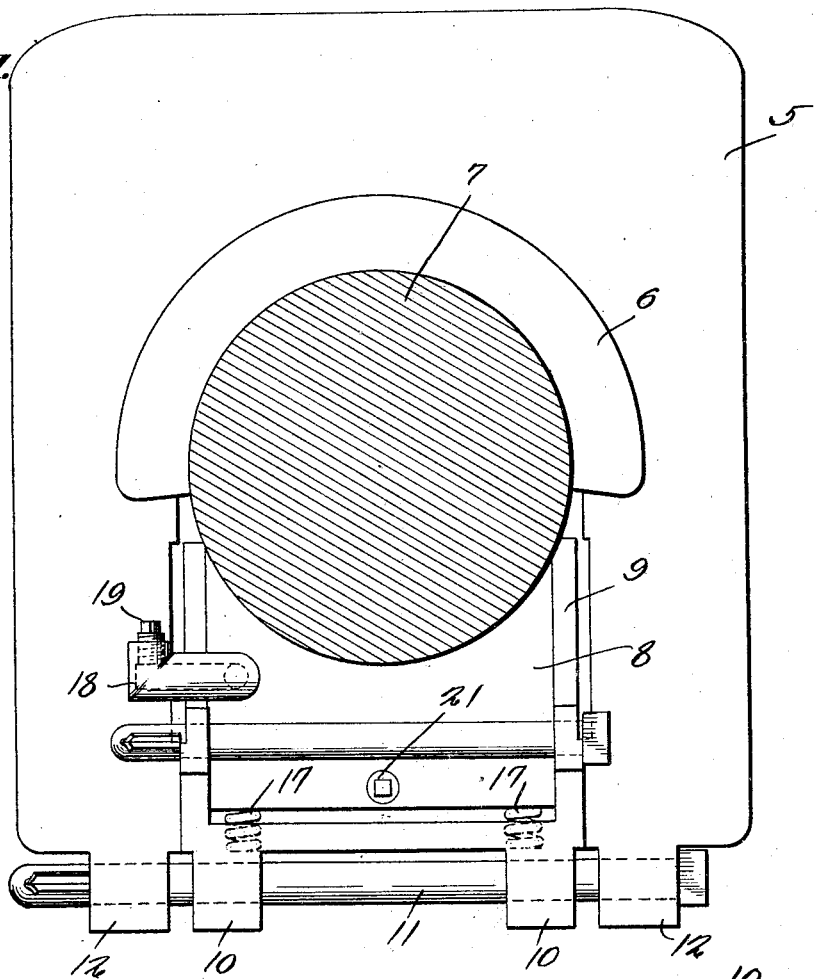
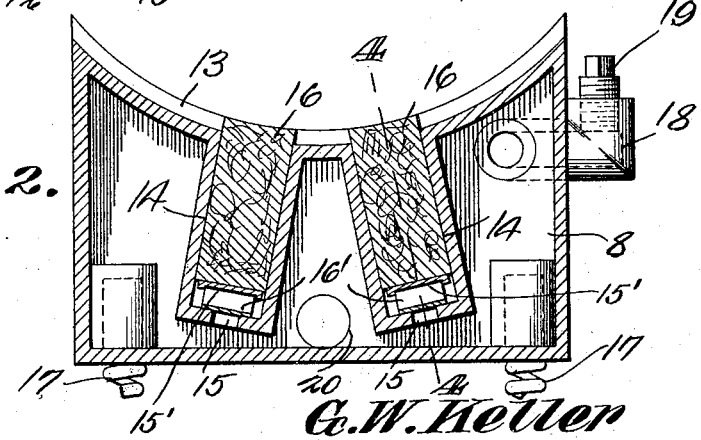

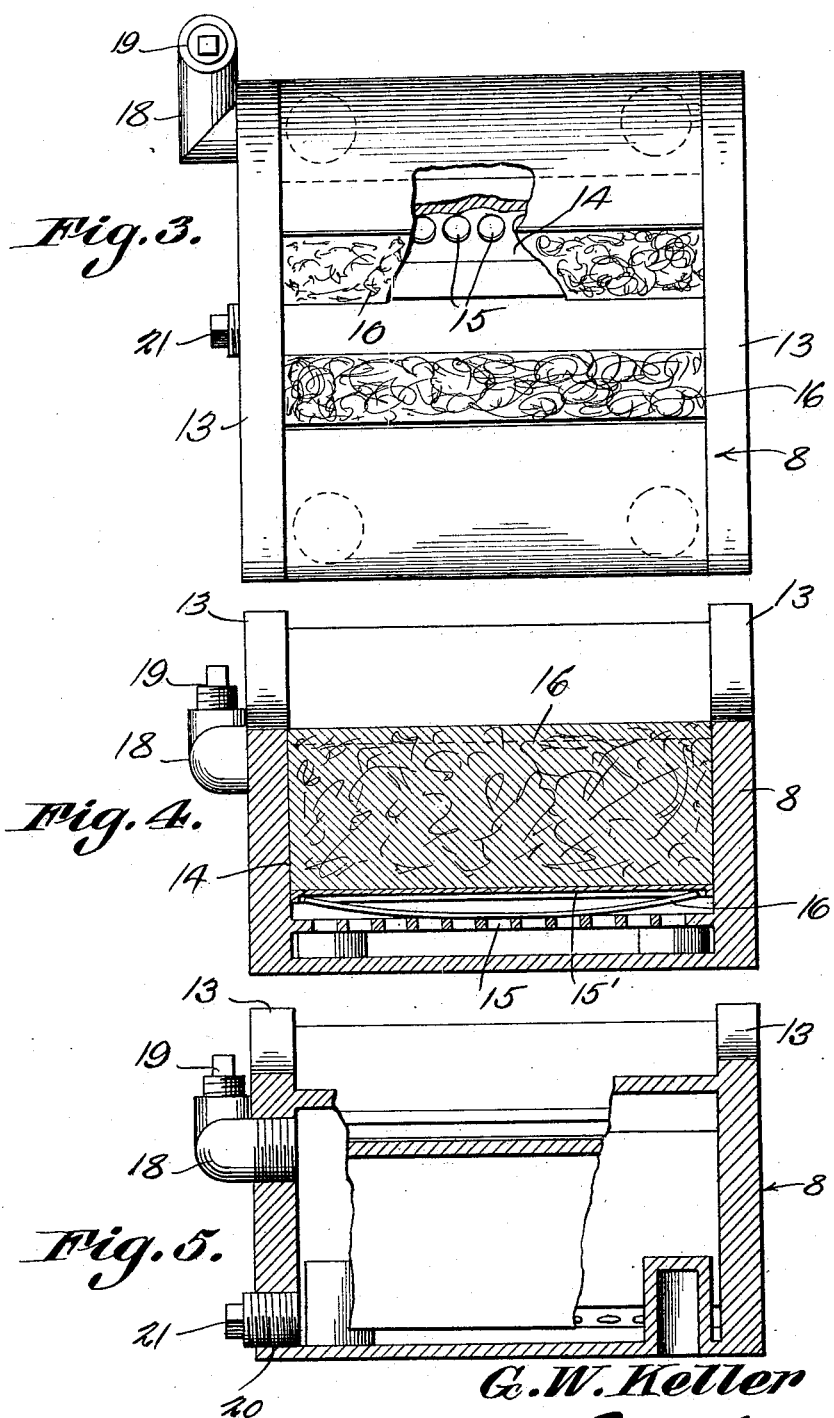

Patented Mar. 18, 1930

1,751,160

UNITED STATES PATENT OFFICE

GEORGE W. KELLER, OF PORTSMOUTH, OHIO

DRIVING AND ENGINE-TRUCK BOX LUBRICATOR

Application filed July 6, 1928. Serial No. 290,828.

This invention relates to a lubricator especially designed for use in connection with driving boxes and engine truck boxes for supplying lubricating material to the shafts operating therein.

An important object of the invention is to provide spring pressed members constructed of absorbent material so that the lubricant will be supplied to the shafts at all times, insuring against a hot box.

A still further object of the invention is the provision of a reservoir for feeding the absorbent members with the lubricating material.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view illustrating a lubricator constructed in accordance with the invention, the drive shaft operating therein, being shown in section.

Figure 2 is a transverse sectional view through the reservoir of the lubricator.

Figure 3 is a top plan view of the lubricator.

Figure 4 is a vertical sectional view through the reservoir taken on line 4—4 of Figure 2.

Figure 5 is a sectional view through one edge of the reservoir.

Referring to the drawings in detail, the reference character 5 designates the driving box of a locomotive which is supplied with the usual liner 6 in which the drive shaft 7 operates.

As shown, the lower portion of the driving box is cut away providing a clearance for the reservoir 8 and U-shaped support 9, in which the reservoir is mounted. This U-shaped support 9 is formed with apertured ears 10 at the base thereof to accommodate the bolt 11 that passes through apertured ears 12 of the driving box 5 so that the support will be held within the cut out portion of the driving box without danger of the support becoming displaced therefrom.

The reservoir 8 has flanges 13 formed adjacent to its ends, the upper surfaces of the flanges being curved as clearly shown by Figure 2 of the drawings, to conform to the curvature of the upper surface of the reservoir. Compartments 14 are formed in the reservoir, the compartments extending throughout the length of the reservoir.

Openings 15 are formed in the compartments and establish communication between the compartments and reservoir so that liquid in the reservoir may pass into the compartments and saturate the wicks 16 which are in the form of layers of felt, the wicks being of widths so that they will contact with the entire bearing surface of the shaft operating within the driving box.

Contacting with each wick, and disposed throughout the length thereof is a follower 15' in the form of an elongated plate having lateral ribs between which the leaf spring 16' is positioned, the ribs contacting with the ends of the springs to prevent lateral movement of the springs. These springs engage the bottoms of the compartments and act to urge the wicks towards the driving shaft so that they will wipe the driving shaft to supply lubricating material thereto. Recesses are formed in the reservoir and are of diameters to accommodate the coiled springs 17 which rest against the bottom of the U-shaped support 9 to normally urge the reservoir upwardly.

Extending into the reservoir is a pipe 18 which is supplied with a plug 19 that may be removed to permit lubricating material to be poured into the reservoir.

In order that the lubricating material may be drained from the reservoir and replaced with new oil, a drain opening 20 is provided at the bottom of the reservoir, the opening 20 being normally closed by means of the plug 21.

I claim:

In a shaft lubricator, a reservoir having a curved upper surface to be fitted against a shaft, compartments formed throughout the length of the reservoir and having their upper ends open at the curved surfaces of the reservoir, the bottoms of the compartments being spaced from the bottom of the reservoir, the bottoms of the compartments having spaced openings disposed throughout the lengths of the compartments to permit oil to pass into the compartments, wicks in the compartments, plates fitted in the compartments and engaging the wicks, springs within the compartments and engaging the plates to force the wicks outwardly into engagement with a shaft, and said reservoir having an opening to permit oil to be poured into the reservoir.

In testimony that I claim the foregoing as my own, I have hereto affixed my signature.

GEORGE W. KELLER.